United States Patent
Lee et al.

(10) Patent No.: US 10,055,060 B2
(45) Date of Patent: Aug. 21, 2018

(54) INTEGRAL SENSING APPARATUS FOR TOUCH AND FORCE SENSING AND METHOD FOR THE SAME

(71) Applicant: SUPERC-TOUCH CORPORATION, New Taipei (TW)

(72) Inventors: Hsiang-Yu Lee, New Taipei (TW); Shang Chin, New Taipei (TW); Ping-Tsun Lin, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 57 days.

(21) Appl. No.: 15/461,447

(22) Filed: Mar. 16, 2017

(65) Prior Publication Data
US 2017/0277351 A1 Sep. 28, 2017

(30) Foreign Application Priority Data
Mar. 24, 2016 (TW) .............................. 105109113 A

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0416* (2013.01); *G06F 2203/04105* (2013.01); *G06F 2203/04107* (2013.01); *G06F 2203/04108* (2013.01)

(58) Field of Classification Search
None
See application file for complete search history.

(56) References Cited

U.S. PATENT DOCUMENTS

2012/0182261 A1* 7/2012 Wang ...................... G06F 3/044
345/174

FOREIGN PATENT DOCUMENTS

| TW | 201232374 A | 8/2012 |
| TW | 201432512 A | 8/2014 |
| TW | 201535242 A | 9/2015 |
| TW | M516745 U | 2/2016 |

OTHER PUBLICATIONS

Office Action dated Nov. 9, 2016 of the corresponding Taiwan patent application.

* cited by examiner

*Primary Examiner* — Nicholas Lee
(74) *Attorney, Agent, or Firm* — Chun-Ming Shih; HDLS IPR Services

(57) ABSTRACT

An integral sensing apparatus includes an upper substrate having a first electrode layer with a plurality of polygonal touch sensing electrodes staggered to each other, a second electrode layer having at least one force sensing electrode, a dielectric layer, and a capacitance sensing circuit. In touch sensing operation, the capacitance sensing circuit sends a touch capacitance-exciting signal to a selected touch sensing electrode and obtains a touch sensing signal therefrom, wherein an auxiliary signal with same phase as the touch capacitance-exciting signal is sent to at least one corresponding force sensing electrode. In force sensing operation, the capacitance sensing circuit sends a force capacitance-exciting signal to the at least one corresponding force sensing electrode and obtains a force sensing signal from the force sensing electrode.

23 Claims, 12 Drawing Sheets

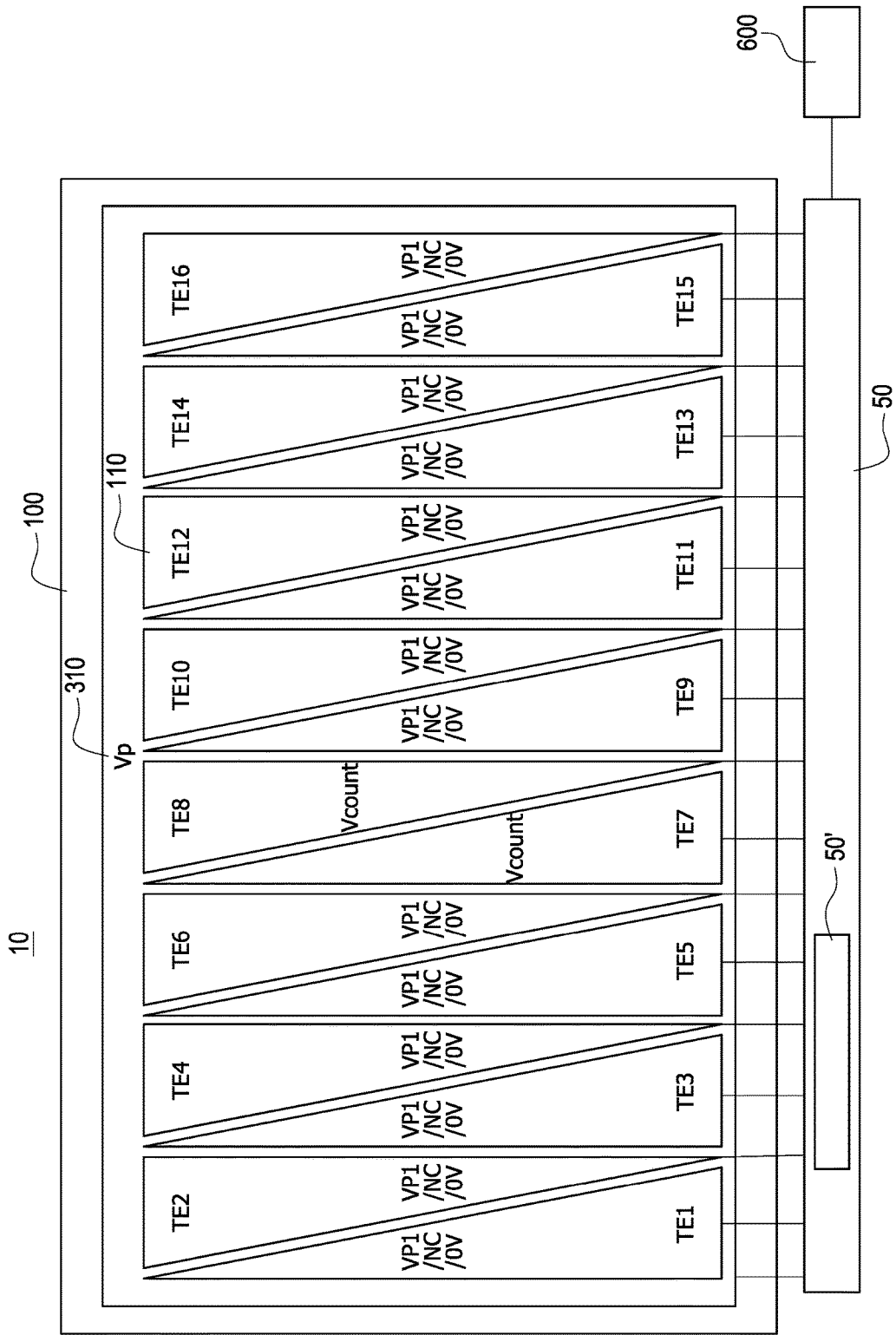

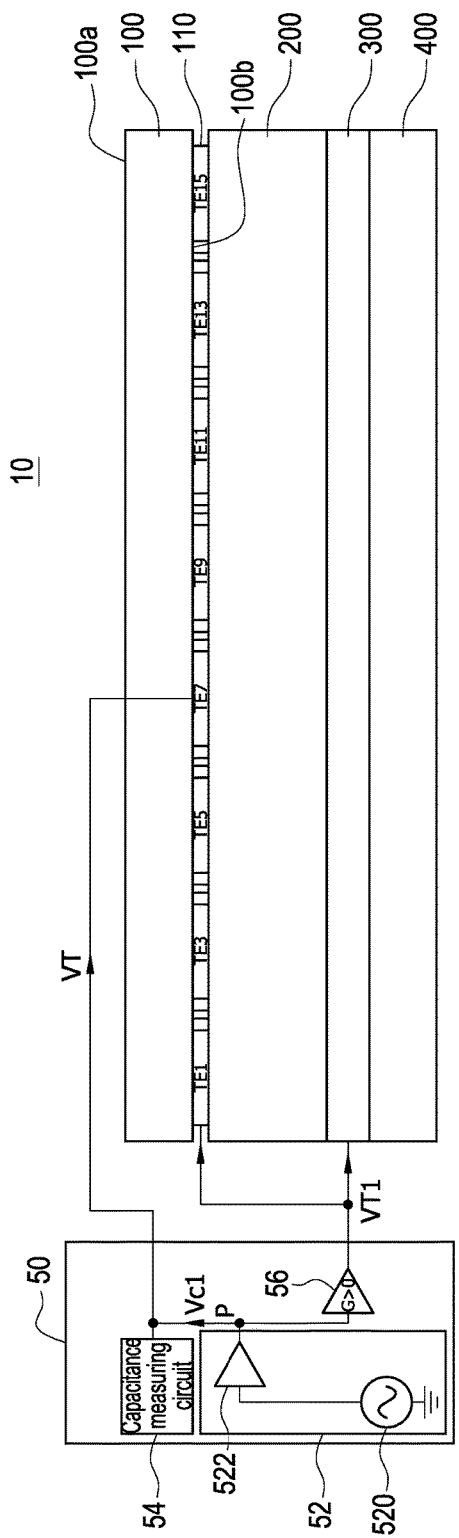
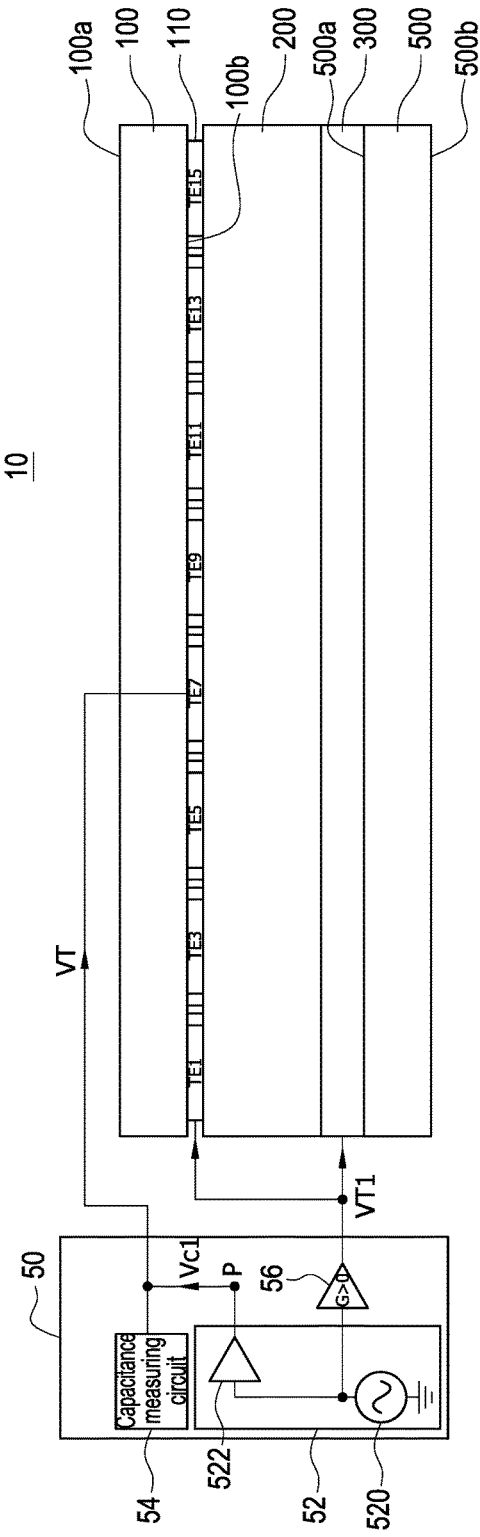
FIG.8A
FIG.8B

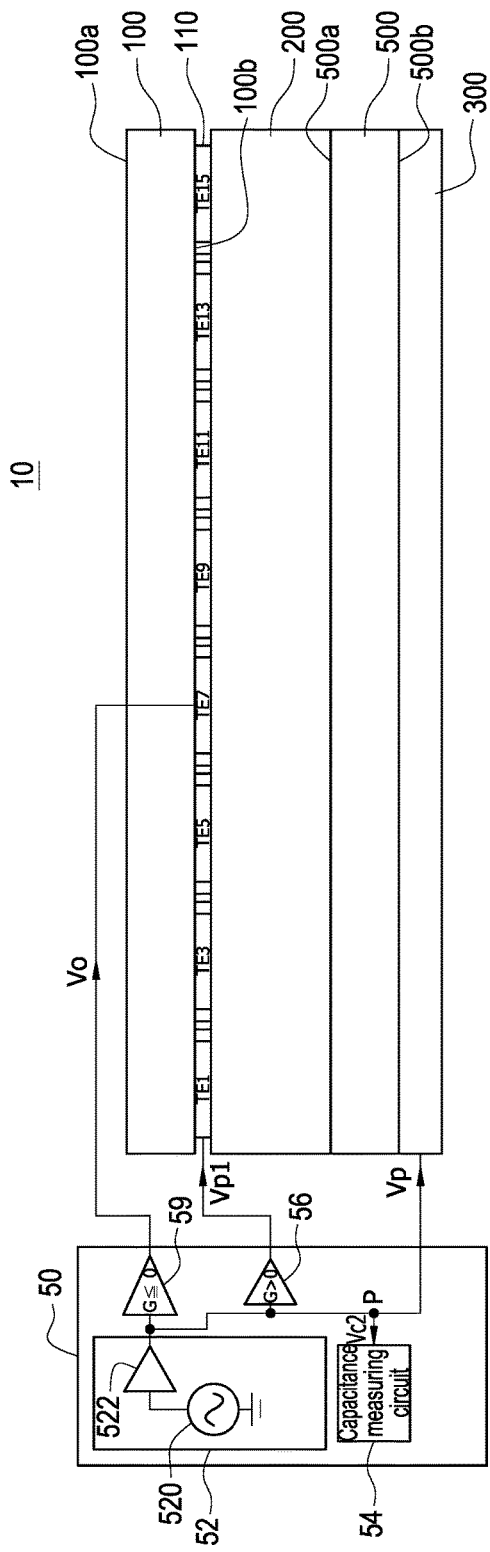
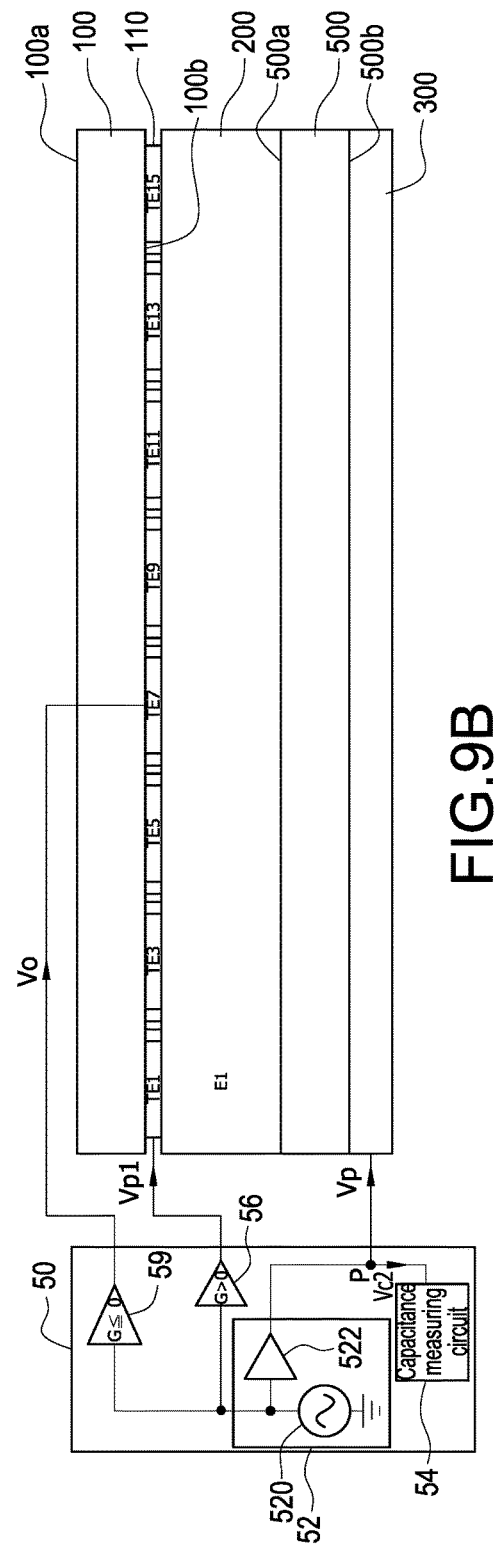
FIG.9A
FIG.9B

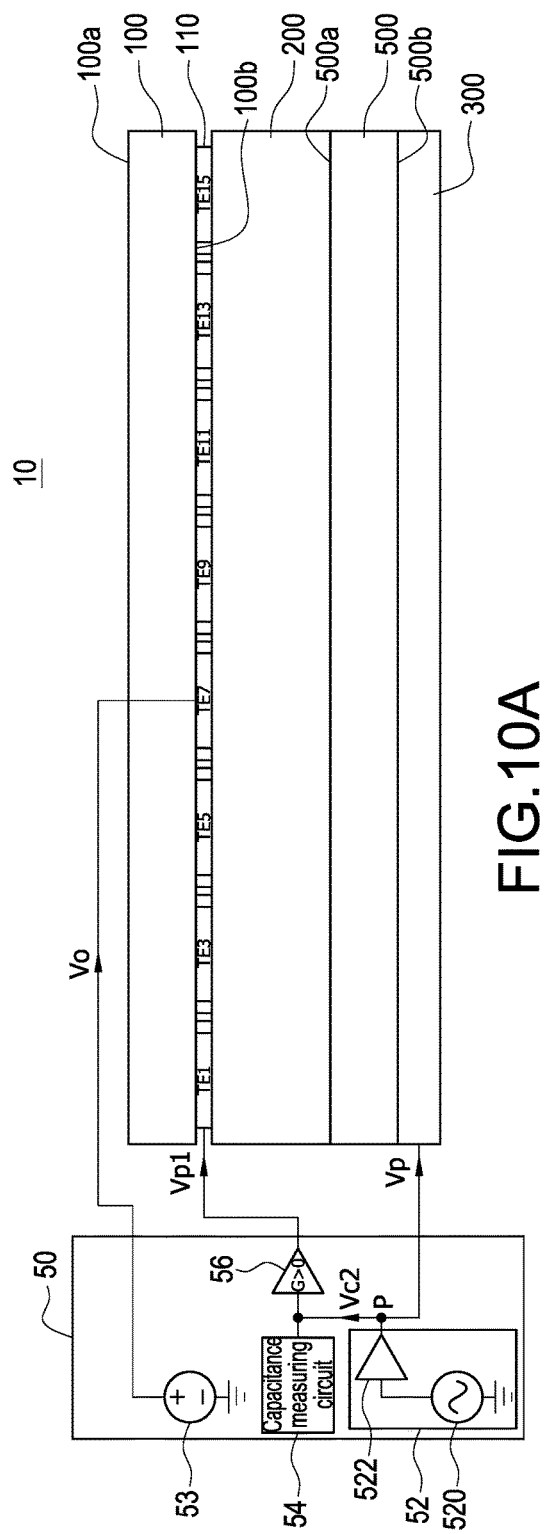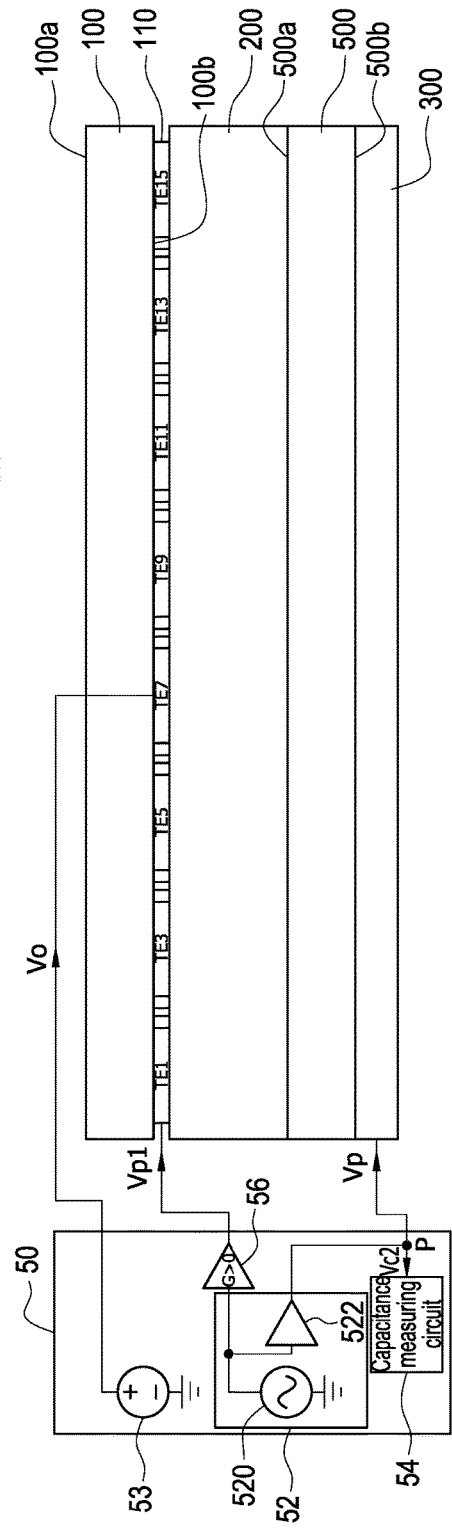
FIG.10A
FIG.10B

INTEGRAL SENSING APPARATUS FOR TOUCH AND FORCE SENSING AND METHOD FOR THE SAME

BACKGROUND OF THE INVENTION

Field of the Invention

The present invention relates to sensing apparatus, especially to an integral sensing apparatus for touch and force sensing.

Description of Prior Art

The touch display panels become popular as the market growing of the compact and lightweight mobile device. The force touch control technology has rapid development owing to the maturity of touch-control user interface and serious demand for 3D touch operation. The conventional force touch control panel generally integrates microelectromechanical sensor at edge or corner of the display panel to sense touch force on the display panel. The cost of the sensor is high and the assembling of the sensor is difficult. Besides, the conventional force touch control panel uses deformable resilient microstructure formed by complicated process to get better relevance between force and deformed degree. The force sensing can be improved by augmented physical variation. However, it still needs lots of effort to improve the force touch control panel.

SUMMARY OF THE INVENTION

It is an object of the present invention to provide an integral sensing apparatus for touch and force sensing to overcome above-mentioned drawbacks.

Accordingly, the present invention provides an integral sensing apparatus for touch and force sensing, comprising: an upper substrate having a first face and a second face opposite to the first face; a first electrode layer arranged on the second face and having a plurality of polygonal touch sensing electrodes staggered to each other, each of the polygonal touch sensing electrodes having a slant side; a second electrode layer having at least one force sensing electrode; a resilient dielectric layer arranged between the first electrode layer and the second electrode layer; and a capacitance sensing circuit electrically connected to the first electrode layer and the second electrode layer;

wherein in touch sensing operation, the capacitance sensing circuit sends a touch capacitance-exciting signal to a selected touch sensing electrode and obtains a touch sensing signal from the selected touch sensing electrode, the capacitance sensing circuit sends an auxiliary signal with same phase as the touch capacitance-exciting signal to at least one corresponding force sensing electrode; wherein in force sensing operation, the capacitance sensing circuit sends a force capacitance-exciting signal to the at least one corresponding force sensing electrode and obtains a force sensing signal from the force sensing electrode, the capacitance sensing circuit sequentially or randomly sends a counter exciting signal to the selected touch sensing electrode.

Accordingly, the present invention provides a method for integral touch and force sensing, comprising: providing an integral sensing apparatus for touch and force sensing, the integral sensing apparatus comprising an upper substrate having a first electrode layer having a plurality of polygonal touch sensing electrodes staggered to each other, each of the polygonal touch sensing electrodes having a slant side, a second electrode layer having at least one force sensing electrode, a resilient dielectric layer arranged between the first electrode layer and the second electrode layer, the resilient dielectric layer being compressively deformed under pressure and restoring to original shape and volume if pressure is not present, and a capacitance sensing circuit; performing a touch sensing procedure by sequentially sending a touch capacitance-exciting signal to a selected touch sensing electrode and obtaining a touch sensing signal from the selected touch sensing electrode;

performing a force sensing procedure by sequentially sending a force capacitance-exciting signal to the at least one corresponding force sensing electrode and obtaining a force sensing signal from the force sensing electrode.

BRIEF DESCRIPTION OF DRAWING

One or more embodiments of the present disclosure are illustrated by way of example and not limitation in the figures of the accompanying drawings, in which like references indicate similar elements. These drawings are not necessarily drawn to scale.

FIG. 7 shows a top view of the integral sensing apparatus for touch and force sensing according to still another embodiment of the present invention.

FIG. 8A shows a schematic view of the integral sensing apparatus for touch and force sensing of the present invention.

FIG. 8B shows a schematic view of the integral sensing apparatus for touch and force sensing according to another embodiment of the present invention.

FIG. 9A shows a schematic view of the integral sensing apparatus for touch and force sensing according to still another embodiment of the present invention.

FIG. 9B shows a schematic view of the integral sensing apparatus for touch and force sensing according to still another embodiment of the present invention.

FIG. 10A shows a schematic view of the integral sensing apparatus for touch and force sensing according to still another embodiment of the present invention.

FIG. 10B shows a schematic view of the integral sensing apparatus for touch and force sensing according to still another embodiment of the present invention.

DETAILED DESCRIPTION OF THE INVENTION

Figure 1:
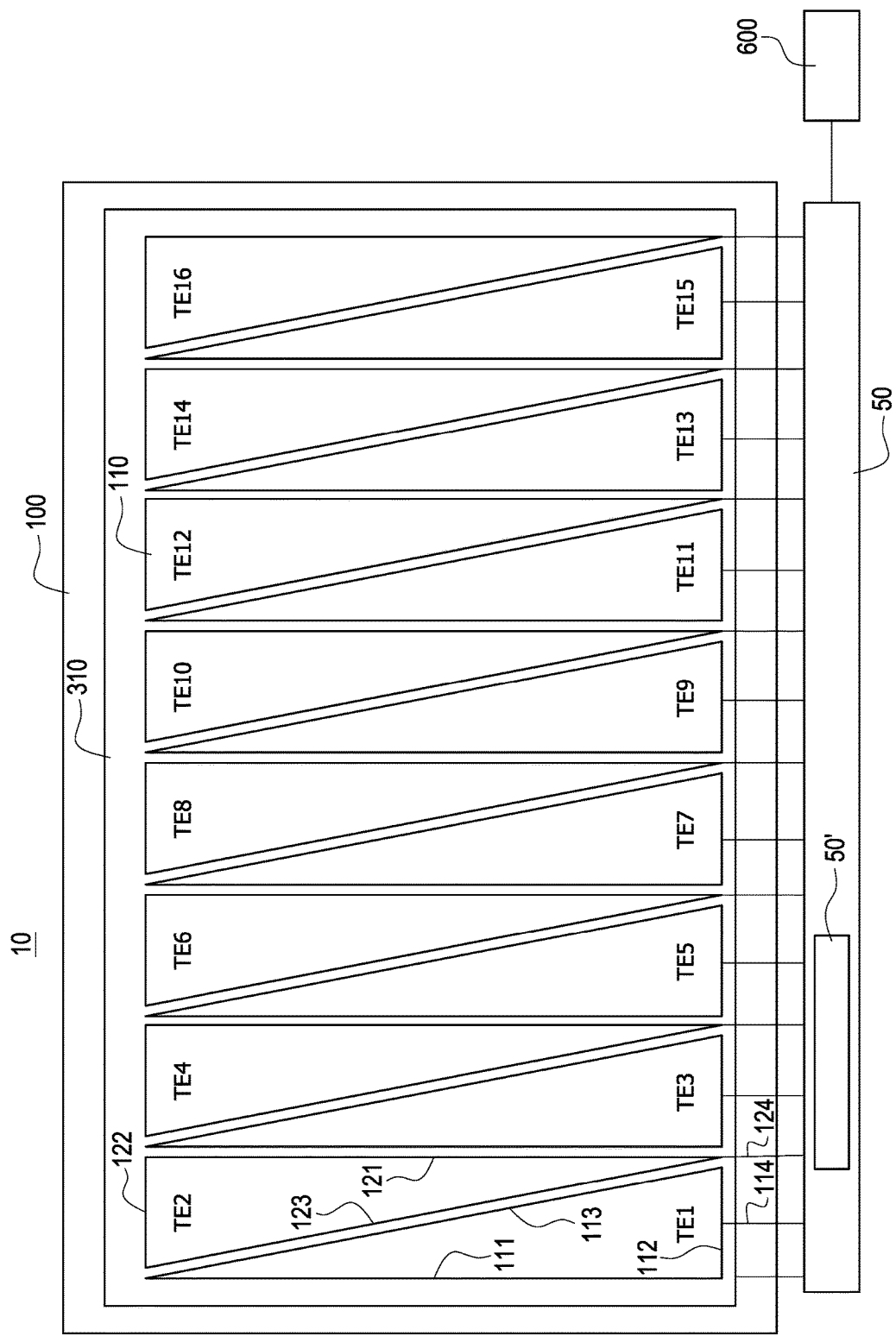
FIG. 1 shows a top view of the integral sensing apparatus for touch and force sensing according to an embodiment of the present invention.
Figure 2:
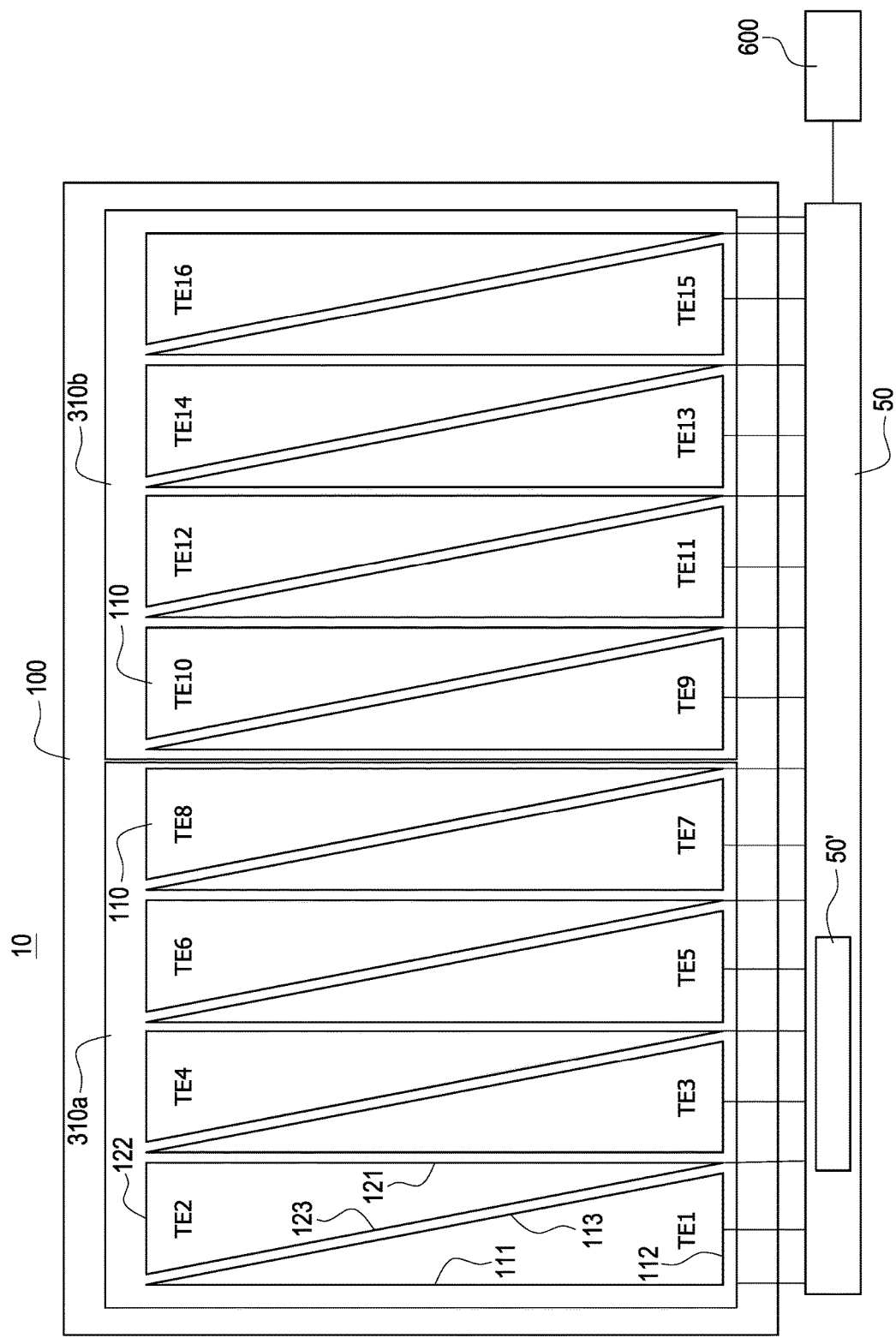
FIG. 2 shows a top view of the integral sensing apparatus for touch and force sensing according to another embodiment of the present invention.

FIG. 8A shows a schematic view of the integral sensing apparatus for touch and force sensing (hereinafter integral sensing apparatus) 10 of the present invention. The integral sensing apparatus 10 comprises, from top to bottom, an upper substrate 100, a resilient dielectric layer 200, a second electrode layer 300 and an adhesive layer 400, where the upper substrate 100 has a first face 100a, a second face 100b and a first electrode layer 110 on the second face 100b. Moreover, the first electrode layer 110 comprises a plurality of touch sensing electrodes interlocked or staggered with each other, for example, the touch sensing electrodes are electrodes TEn shown in FIG. 1. However, FIG. 8A is a sectional view and the number, shape, distribution of the touch sensing electrodes TE1~TE15 are not limited by this drawing. The touch sensing electrodes TE1~TE15 may be polygonal with slanting side, such as triangle or trapezoid. The second electrode layer 300 is arranged on a side of the first electrode layer 110, the side is opposite to the upper substrate 100, the second electrode layer 300 includes at least one force sensing electrode 310 (for example, the second electrode layer 300 has one force sensing electrode 310 as shown in FIG. 1, or the second electrode layer 300 has two force sensing electrodes 310a, 310b as shown in FIG. 2). The integral sensing apparatus 10 further comprises a capacitance sensing circuit 50, and the capacitance sensing circuit 50 comprises a capacitance-excitation driving circuit 52 and a capacitance measuring circuit 54. The resilient dielectric layer 200 is compressively deformed with pressure, and restores to original volume and shape when the pressure is not present. The resilient dielectric layer 200 comprises a resilient gelatinous material, which can be, for example but not limited to, polydimethylsiloxane (PDMS), or optical clear adhesive (OCA).

With reference again to FIG. 8A, the integral sensing apparatus 10 is operated for touch control sensing. The capacitance-excitation driving circuit 52 comprises a signal source 520 and a driving unit 522 and sequentially or randomly applies a touch capacitance-exciting signal VT for touch-control sensing to a selected touch sensing electrode (for example, the touch sensing electrode TE7 shown in FIG. 8A). The capacitance-excitation driving circuit 52 further sends the touch capacitance-exciting signal VT to a non-inverting amplifier 56, where the gain of the non-inverting amplifier 56 is preferably one to generate an auxiliary signal VT1 having the same phase as that of the touch capacitance-exciting signal VT. The auxiliary signal VT1 is applied to at least one corresponding force sensing electrode 310. The "correspondence" means the selected touch sensing electrodes TE7 is at least overlapped with one corresponding force sensing electrode 310 from projected view. By applying a signal with the same phase as the touch capacitance-exciting signal VT on the corresponding force sensing electrode 310, effectively there is minute (or even no) voltage difference between the selected touch sensing electrode TE7 and the corresponding force sensing electrode 310. Therefore, there is minute (or even no) capacitance between the selected touch sensing electrode TE7 and the corresponding force sensing electrode 310. The influence to capacitance measurement due to warp of the resilient dielectric layer 200 can be prevented when sensing a touch operation for the selected touch sensing electrode TE7. Moreover, the influence to capacitance measurement due to parallel capacitance from the corresponding force sensing electrode 310 and the ground point can also be prevented.

Similarly, the auxiliary signal VT1 can also be sent to all other touch sensing electrodes around the selected touch sensing electrodes TE7 to eliminate the stray capacitance effect between the selected touch sensing electrode and the surrounding touch sensing electrodes, and to concentrate electric field lines on the selected touch sensing electrode, thus increasing the sensitivity of proximity sensing.

Furthermore, in the present invention, touch sensing includes proximity sensing of user finger close to the upper substrate 100. When the user finger is actually in contact with the integral sensing apparatus 10 or gets close to the integral sensing apparatus 10, the relative capacitances of the touch sensing electrodes in the integral sensing apparatus 10 are affected, therefore the contact or approaching of user finger with respect to the integral sensing apparatus 10 can be sensed by sensing the capacitance. In the following description, the description for touch sensing encompasses proximity sensing.

With the integral sensing apparatus 10 in FIG. 8A, the auxiliary signal VT1 can be used to decrease or eliminate the influence of warp or deformation of the resilient dielectric layer 200. After the capacitance excitation driving circuit 52 of the capacitance sensing circuit 50 sends the touch capacitance-excitation signal VT to the selected touch sensing electrode TE7, the capacitance measuring circuit 54 of the capacitance sensing circuit 50 can measure the touch sensing signal Vc1 at sensing point P, then the touch location can be determined precisely.

FIG. 8B shows a schematic view of the integral sensing apparatus 10 according to another embodiment of the present invention. The embodiment in FIG. 8B is similar to that in FIG. 8A, the capacitance excitation driving circuit 52 in the embodiment directly sends the signal source 520 to a non-inverting amplifier 56(bypassing a driving unit 522), a gain of the non-inverting amplifier 56 is preferably 1 to generate an auxiliary signal VT1 with phase same with that of the touch capacitance-excitation signal VT. Because the sensing point P and the auxiliary signal VT1 are separated in the embodiment, the measurement result is not affected by the auxiliary signal VT1. Similarly, the auxiliary signal VT1 can be used to decrease or eliminate the influence of warp or deformation of the resilient dielectric layer 200. After the capacitance excitation driving circuit 52 of the capacitance sensing circuit 50 sends the touch capacitance-excitation signal VT to the selected touch sensing electrode TE7, the capacitance measuring circuit 54 of the capacitance sensing circuit 50 can measure the touch sensing signal Vc1 at sensing point P, then the touch location can be determined precisely. Moreover, the integral sensing apparatus 10 further comprises a lower substrate 500 arranged on a side of the resilient dielectric layer 200 opposite to the first electrode layer 110. The lower substrate 500 is a glass substrate or a polymer substrate, or a color filter substrate for a display screen. Moreover, the lower substrate 500 has two faces 500a and 500b.

Figure 6:
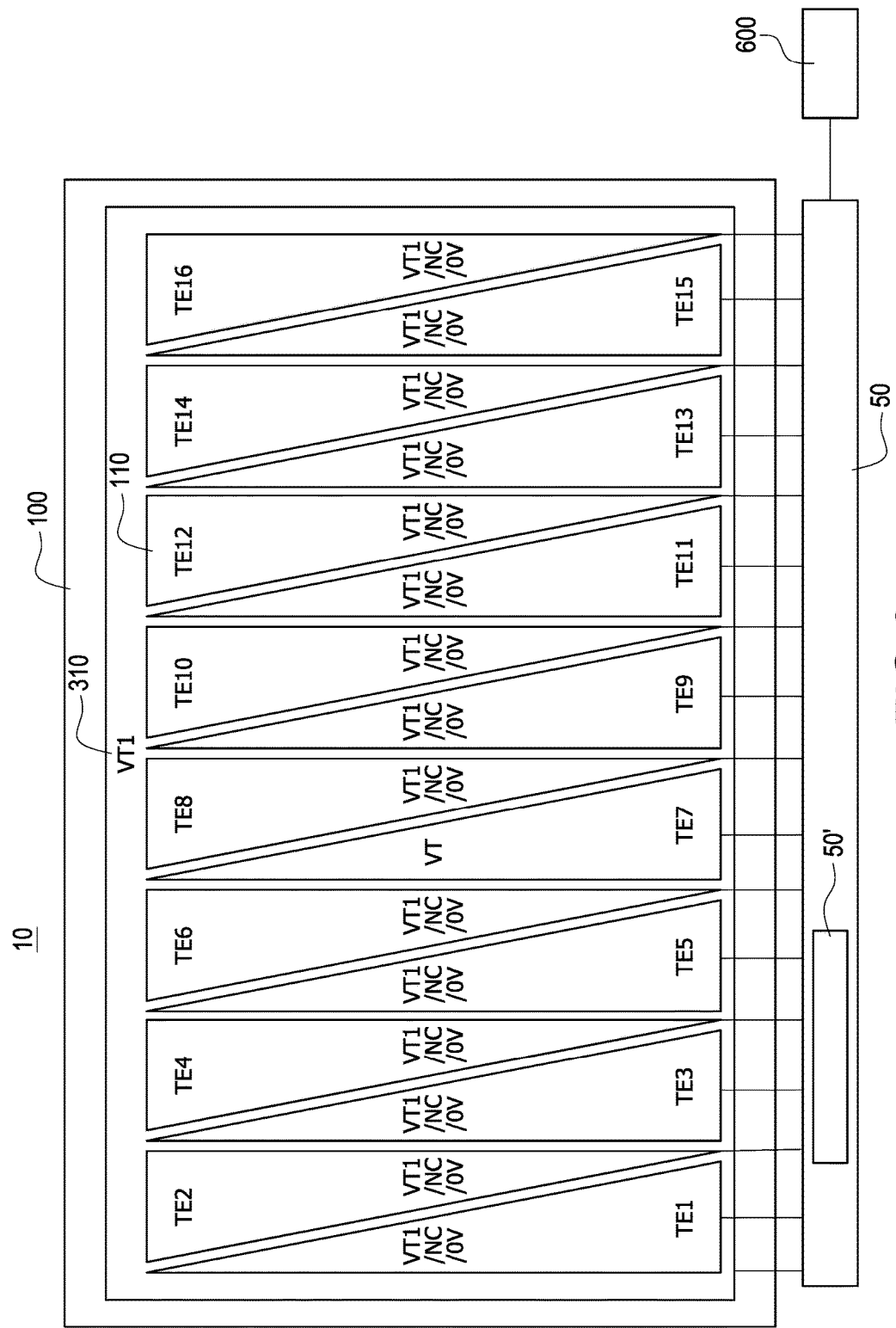
FIG. 6 shows a top view of the integral sensing apparatus for touch and force sensing according to still another embodiment of the present invention.

FIG. 6 is top view showing the integral sensing apparatus 10 according to another embodiment of the present invention. The embodiment is similar that shown in FIG. 1 and is used to demonstrate the distribution of the touch capacitance-excitation signal VT and the auxiliary signal VT1 in the touch sensing operation of the integral sensing apparatus 10 (such as the operations in FIGS. 8A and 8B).

The capacitance sensing circuit 50 sequentially or randomly applies a touch capacitance-exciting signal VT for touch-control sensing to a selected touch sensing electrode (for example, the touch sensing electrode TE7 shown in FIG. 6). The capacitance sensing circuit 50 further processes the touch capacitance-exciting VT to an auxiliary signal VT1 having the same phase as that of the touch capacitance-exciting VT. The auxiliary signal VT1 is sent to at least one corresponding force sensing electrode 310 arranged on the second electrode layer 300. By applying a signal with the same phase as the touch capacitance-exciting signal VT on the corresponding force sensing electrode 310, effectively there is minute (or even no) voltage difference between the selected touch sensing electrode TE7 and the corresponding force sensing electrode 310. Therefore, there is minute (or even no) capacitance between the selected touch sensing electrode TE7 and the corresponding force sensing electrode 310. The influence to capacitance measurement due to warp of the resilient dielectric layer 200 can be prevented when sensing a touch operation for the selected touch sensing electrode TE7. Moreover, the influence to capacitance measurement due to parallel capacitance from the corresponding force sensing electrode 310 and the ground point can also be prevented. Moreover, the auxiliary signal VT1 are also sent to all other touch sensing electrodes around the selected touch sensing electrodes TE7 to eliminate the stray capacitance effect between the selected touch sensing electrode and the surrounding touch sensing electrodes, and concentrate electric field lines on the selected touch sensing electrode, thus increasing the sensitivity of proximity sensing. Besides, in touch sensing operation, other touch sensing electrodes around the selected touch sensing electrodes TE7 can be applied with zero voltage (OV) or can be floated (no connection, NC) besides being applied with the auxiliary signal VT1.

FIG. 1 shows a top view of the integral sensing apparatus 10 according to an embodiment of the present invention, which mainly depicts the upper substrate 100, the first electrode layer 110, the force sensing electrode 310, the capacitance sensing circuit 50 and the self-capacitance sensing circuit 50'. The touch sensing electrodes TE1-TE16 are polygonal staggered to each other shown in this figure. The polygonal has a slanting side and can be for example, triangle or trapezoid. In the shown example, the touch sensing electrode TE1 is staggered with the touch sensing electrode TE2. The first side (first cathetus) 111 and the second side (second cathetus) 112 of the touch sensing electrode TE1 are vertical to each other. The first side (first cathetus) 121 and the second side (second cathetus) 122 of the touch sensing electrode TE2 are vertical to each other. The slanting side (hypotenuse) 113 of the touch sensing electrode TE1 is parallel to the slanting side (hypotenuse) 123 of the touch sensing electrode TE2, thus forming two staggered right-angle triangles. The touch sensing electrode TE1 is connected to the capacitance sensing circuit 50 through the conductive wire 114, and the touch sensing electrode TE2 is connected to the capacitance sensing circuit 50 through the conductive wire 124, and so on. Therefore, the capacitance sensing circuit 50 can send signals for touch sensing to the touch sensing electrode TE1-15 in touch sensing operation.

FIG. 2 shows a top view of the integral sensing apparatus 10 according to another embodiment of the present invention. The integral sensing apparatus 10 shown in FIG. 2 is similar to that shown in FIG. 1; however, the integral sensing apparatus 10 shown in FIG. 2 has two force sensing electrodes 310a, 310b. The touch sensing electrodes TE1~TE8 are corresponding to one force sensing electrode 310a, while the remaining touch sensing electrodes TE9~TE16 are corresponding to the other force sensing electrode 310b.

Figure 3:
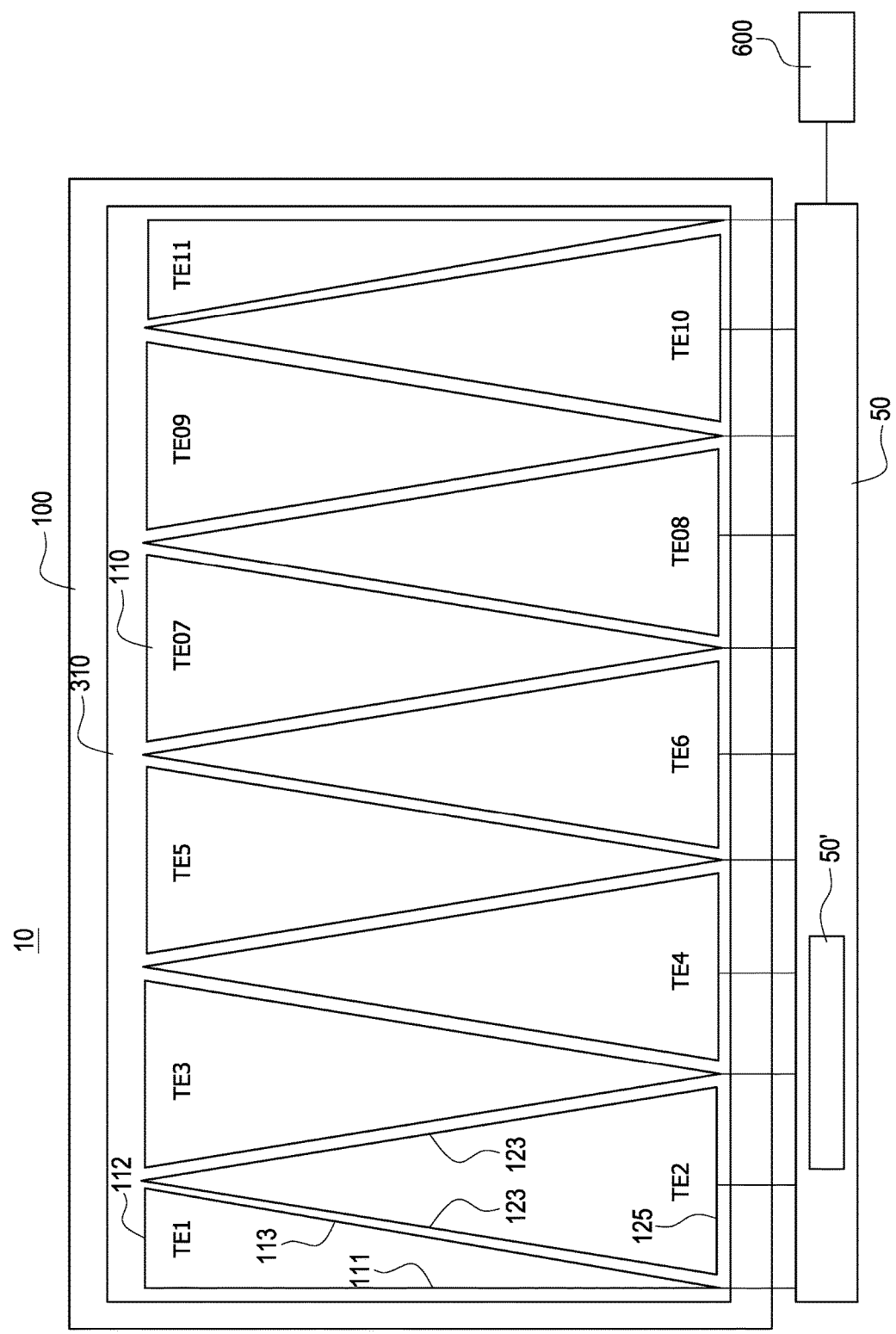
FIG. 3 shows a top view of the integral sensing apparatus for touch and force sensing according to still another embodiment of the present invention.

FIG. 3 shows a top view of the integral sensing apparatus 10 according to still another embodiment of the present invention. The integral sensing apparatus 10 shown in FIG. 3 is similar to that shown in FIG. 1. The touch sensing electrodes TE1-TE11 are also polygonal staggered to each other. The polygonal has a slanting side and can be for example, triangle or trapezoid. In the shown example, the touch sensing electrodes TE1, TE11 at peripheral locations are right-angle triangles, where the first side (first cathetus) 111 and the second side (second cathetus) 112 in the touch sensing electrode TE1 are vertical to each other. The slanting side 113 of the touch sensing electrode TE1 is parallel to the slanting side 123 of the touch sensing electrode TE2. The touch sensing electrode TE2 is an isosceles triangle with two legs (slanting sides) 123 and a base 125. Moreover, the touch sensing electrode TE3~10 are also isosceles triangles. The slanting sides of two adjacent triangles are parallel to each other.

Figure 4:
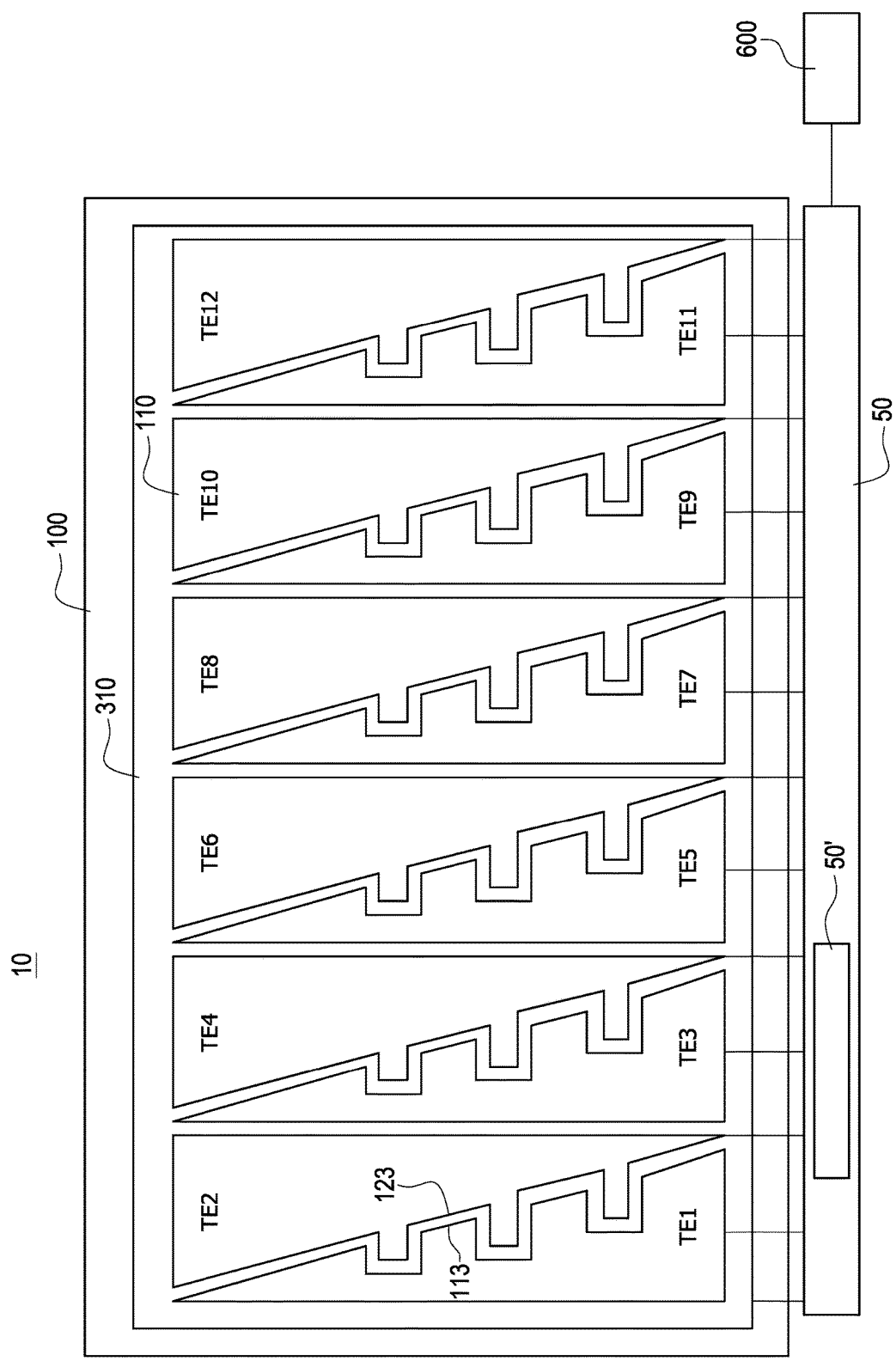
FIG. 4 shows a top view of the integral sensing apparatus for touch and force sensing according to still another embodiment of the present invention.

FIG. 4 shows a top view of the integral sensing apparatus 10 according to still another embodiment of the present invention. The integral sensing apparatus 10 shown in FIG. 4 is similar to that shown in FIG. 1. The touch sensing electrodes TE1-TE12 are also polygonal with a side having concave parts or convex parts. As shown in FIG. 4, the touch sensing electrode TE1 has concaves parts on the slanting side 113 thereof, while the shapes of the touch sensing electrodes TE3, TE5, TE7, TE9, and TE11 are similar to the shape of the touch sensing electrode TE1 The touch sensing electrode TE2 has convex parts on the slanting side 123 thereof, while the shapes of the touch sensing electrodes TE4, TE6, TE8, TE10, and TE12 are similar to the shape of the touch sensing electrode TE2. Simply put, the slanting sides of the touch sensing electrodes in this embodiment have convex parts/concave parts interlocked with each other.

Figure 5:
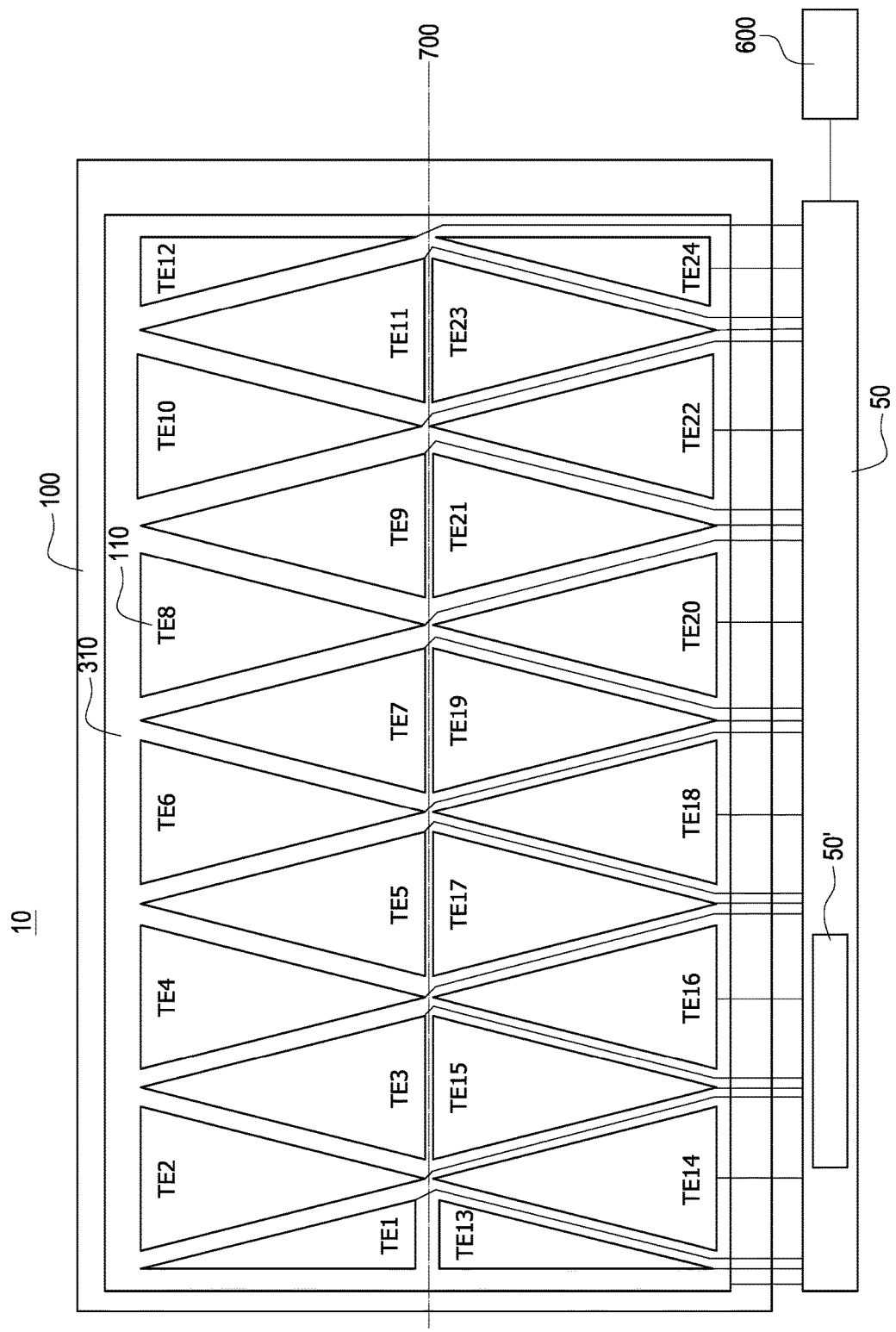
FIG. 5 shows a top view of the integral sensing apparatus for touch and force sensing according to still another embodiment of the present invention.

FIG. 5 shows a top view of the integral sensing apparatus 10 according to still another embodiment of the present invention. The integral sensing apparatus 10 shown in FIG. 5 has two rows of touch sensing electrodes TE1~TE12, and TE13~TE24, which are symmetric with respect to an axial line 700. Namely, the touch sensing electrodes TE1~TE12 are the first row of touch sensing electrodes and the touch sensing electrodes TE13~TE24 are the second row of touch sensing electrodes. Each of the touch sensing electrodes is connected to the capacitance sensing circuit 50 through corresponding conductive wire. Therefore, the capacitance sensing circuit 50 can send signals for touch sensing to the touch sensing electrodes TE1-24 in touch sensing operation.

FIG. 9A shows schematic view of the integral sensing apparatus 10 according to the present invention, which are used for force sensing. The operations shown in FIG. 9A can follow the touch sensing operation in FIG. 8A. After performing the touch sensing operation for the selected touch sensing electrode TE7, the integral sensing apparatus 10 performs force sensing for the force sensing electrode corresponding to the selected touch sensing electrode TE7, or performs force sensing for all of the force sensing electrodes. The integral sensing apparatus 10 sends a force capacitance-exciting signal Vp for force sensing to the force sensing electrode in the force sensing electrode layer 300. The capacitance sensing circuit 50 further comprises a non-inverting amplifier 56, where the gain of the non-inverting amplifier 56 is preferably one to generate a shielding signal Vp1 having the same phase as that of the force capacitance-exciting signal Vp. The shielding signal Vp1 is applied to the non-selected touch sensing electrodes, namely, the touch sensing electrodes TE1~TE5, TE9~TE15. In other word, the shielding signal Vp1 is applied to at least part of the touch sensing electrodes other than the selected touch sensing electrode TE7. The capacitance sensing circuit 50 of the integral sensing apparatus 10 has an inverting amplifier 59 with gain equal to zero or smaller than zero. The capacitance sensing circuit 50 sends the force capacitance-exciting signal Vp to the inverting amplifier 59 to generate a counter-exciting signal Vcount, which is zero voltage or is an alternating signal with phase opposite to the phase of the force capacitance-exciting signal Vp. The counter-exciting signal Vcount is applied, sequentially or randomly, to the selected touch sensing electrode TE7 during force sensing operation, thus enhancing the preciseness of the force sensing operation.

FIG. 9B shows schematic view of the integral sensing apparatus 10 according to the present invention, which is also used for force sensing. The embodiment shown in FIG. 9B is similar to that shown in FIG. 9A. Similarly, the capacitance sensing circuit 50 of the integral sensing apparatus 10 uses the inverting amplifier 59 to generate a counter-exciting signal Vcount, which is zero voltage or is an alternating signal with phase opposite to the phase of the force capacitance-exciting signal Vp. The counter-exciting signal Vcount is applied, sequentially or randomly, to the selected touch sensing electrode TE7 during force sensing operation, thus enhancing the preciseness of the force sensing operation. However, in FIG. 9B, the input of the non-inverting amplifier 56 for generating the shielding signal Vp1 is not connected to the input of the capacitance measuring circuit 54 (for example, the input of the non-inverting amplifier 56 is directly connected to the signal source 520) to prevent the influence from the force-sensing signal Vc2 at the input of the capacitance measuring circuit 54.

FIG. 10A shows schematic view of the integral sensing apparatus 10 according to the present invention, which is also used for force sensing. The embodiment shown in FIG. 10A is similar to that shown in FIG. 9A. However, the capacitance sensing circuit 50 has a DC reference signal source 53 to replace the inverting amplifier 59 in FIG. 9A. Similarly, the shielding signal Vp1, which is processed by the non-inverting amplifier 56 and has the same phase as that of the force capacitance-exciting signal Vp, is applied to the non-selected touch sensing electrodes, namely, at least part of the touch sensing electrodes other than the selected touch sensing electrode TE7 to shield the capacitance variation caused by finger and enhance force sensing preciseness. Moreover, the capacitance sensing circuit 50 sends the counter-exciting signal Vcount of predetermined level to the selected touch sensing electrode TE7 during force sensing operation, thus enhancing the preciseness of the force sensing operation. The capacitance measuring circuit 54 of the capacitance sensing circuit 50 measures the force-sensing signal Vc2 (resulted from the force sensing electrode such as the force sensing electrode 310a) at the sensing point P, thus precisely determining whether touch event is present on the selected touch sensing electrode TE7 and the relevant force.

FIG. 10B shows schematic view of the integral sensing apparatus 10 according to the present invention, which is also used for force sensing. The embodiment shown in FIG. 10B is similar to that shown in FIG. 10A. However, the input of the non-inverting amplifier 56 for generating the shielding signal Vp1 is not connected to the input of the capacitance measuring circuit 54 (for example, the input of the non-inverting amplifier 56 is directly connected to the signal source 520) to prevent the influence from the force-sensing signal Vc2 at the input of the capacitance measuring circuit 54.

FIG. 7 is a top view showing the integral sensing apparatus 10 according to another embodiment of the present invention. The embodiment is similar that shown in FIG. 1 and is used to demonstrate the distribution of the force capacitance-exciting signal Vp, the shielding signal Vp1 and the counter-exciting signal Vcount in the force sensing operation of the integral sensing apparatus 10 (such as the operations in FIGS. 9A to 10B).

In force sensing operation, the capacitance sensing circuit 50 sends a force capacitance-exciting signal Vp for force sensing to the force sensing electrode 310 on the force sensing electrode layer 300. The capacitance sensing circuit 50 further processes the force capacitance-exciting signal Vp to generate a shielding signal Vp1 having the same phase as that of the force capacitance-exciting signal Vp, and applies the shielding signal Vp1 to non-selected touch sensing electrodes, namely, at least part of the touch sensing electrodes other than the selected touch sensing electrode TE7 to shield the capacitance variation caused by finger and enhance force sensing preciseness. Moreover, a counter-exciting signal Vcount, which is zero voltage or is an alternating signal with phase opposite to the phase of the force capacitance-exciting signal Vp, is applied to the selected touch sensing electrode TE7 to enhance the measurement of force sensing at the touch point. Moreover, other touch sensing electrodes than the selected touch sensing electrodes TE7 can be applied with reference voltage (such as 0V) or can be floated (no connection, NC) besides being applied with the shielding signal Vp1.

It should be noted that, in the above embodiments, the separation between adjacent touch sensing electrodes should be small to provide good shielding for the force sensing electrode 310. Namely, the force sensing operation can be conducted without being influenced by external charge-carrying conductor or human finger.

Figure 11:
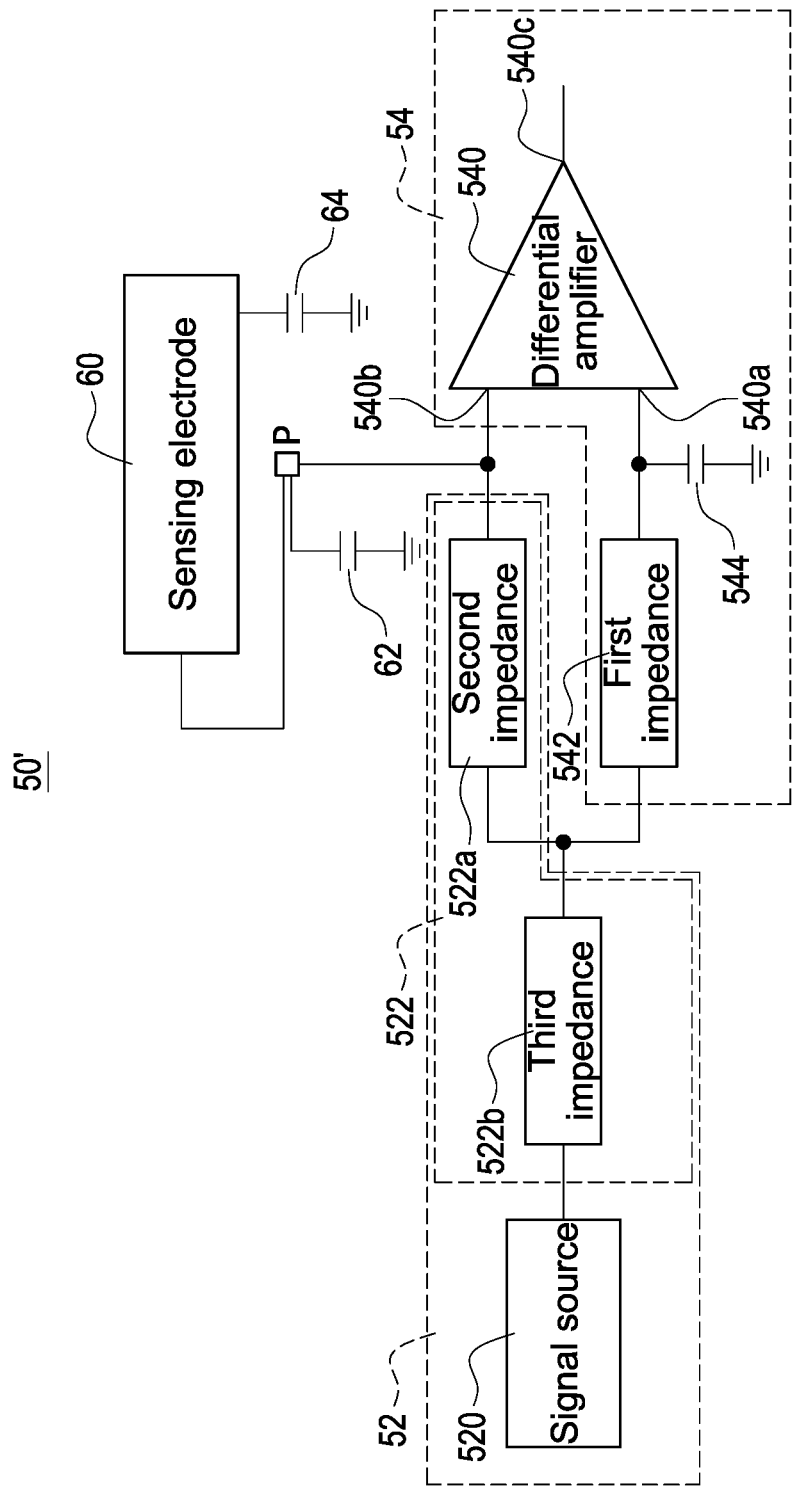
FIG. 11 shows the circuit diagram of the self-capacitance sensing circuit according to an embodiment of the present invention.

FIG. 11 shows the circuit diagram of the self-capacitance sensing circuit 50' according to an embodiment of the present invention. The self-capacitance sensing circuit 50' mainly comprises a capacitance-excitation driving circuit 52 and a capacitance measuring circuit 54 to sense a capacitance change at the sensing point P. The capacitance-excitation driving circuit 52 comprises a signal source 520 and a driving unit 522 (including a second impedance 522a and a third impedance 522b). The capacitance measuring circuit 54 comprises a differential amplifier 540, a first impedance 542 and a first capacitor 544 and is used to sense a capacitance change at a sensing electrode 60, where the sensing electrode 60 comprises a first stray capacitance 62 and a second stray capacitance 64.

The signal source 520 is electrically coupled with the first impedance 542 and the second impedance 522a. The first impedance 542 is electrically coupled with the first capacitor 544 and the first capacitor 544 is electrically coupled with the first input end 540a of the differential amplifier 540. The second impedance 522a is electrically coupled with the second input end 540b of the differential amplifier 540. The sensing electrode 60 is electrically coupled to the second impedance 522a and the second input end 540b through a node (such as an IC pin) of the self-capacitance sensing circuit 50'. The first stray capacitance 62 is electrically coupled to the node and the second stray capacitance 64 is electrically coupled to the sensing electrode 60.

In the self-capacitance sensing circuit 50' shown in FIG. 11, the sensing electrode 60 receives a touch signal when a finger or a conductor is touched thereon. The signal source 520 is a periodical signal and sent to the third impedance 522, while the resistance values of the first impedance 542 and the second impedance 522a are identical. The differential amplifier 540 will generate a differential touch signal after receiving the signal source 520 and the touch signal from the sensing electrode 60. In this embodiment, the capacitance of the first capacitor 544 is equal to the resulting capacitance of the first stray capacitance 62 in parallel connection with the second stray capacitance 64. The capacitance of the second stray capacitance 64 changes when user finger approaches or touches the sensing electrode 60. Therefore, the voltages fed to the first input end 540a and the second input end 540b will be different such that the differential amplifier 540 has a (non-zero) differential output at the output end 540c. In this way, the minute capacitance change on the sensing electrode 60 can be detected by the differential amplifier 540. Moreover, the noise from circuits or power source can be advantageously removed. The detail of the self-capacitance sensing circuit 50' can be referred to U.S. Pat. No. 8,704,539 (corresponding to Taiwan patent No. 1473001) filed by the same applicant.

Figure 12:
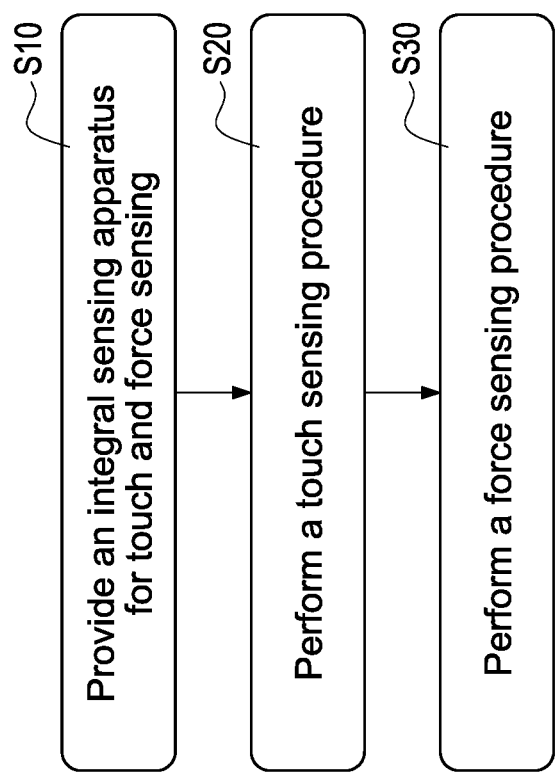
FIG. 12 shows a flowchart for a method for integral touch and force sensing according to the present invention.

FIG. 12 shows a flowchart for a method for integral touch and force sensing according to the present invention. The method comprises following steps. In step S10, an integral sensing apparatus for touch and force sensing is provided. The integral sensing apparatus comprises an upper substrate 100 having a first electrode layer 110 arranged on a face thereof and having a plurality of polygonal touch sensing electrodes staggered to each other, each of the polygonal touch sensing electrodes having a slant side, a second electrode layer 300 having at least one force sensing electrode 310, a resilient dielectric layer 200 arranged between the first electrode layer 110 and the second electrode layer 300, the resilient dielectric layer 200 being compressively deformed under pressure and restoring to original shape and volume if pressure is not present, and a capacitance sensing circuit 50 (including the self-capacitance sensing circuit 50' shown in FIG. 11) and a processor 600. In step S20, a touch sensing procedure is performed. In the touch sensing procedure, the capacitance sensing circuit 50 sequentially sends a touch capacitance-exciting signal to a selected touch sensing electrode and obtains a touch sensing signal from the selected touch sensing electrode, thus performing the touch sensing procedure. In step S30, a force sensing procedure is performed. In the force sensing procedure, the capacitance sensing circuit 50 sequentially sends a force capacitance-exciting signal to the at least one corresponding force sensing electrode and obtains a force sensing signal from the force sensing electrode, thus performing the force sensing procedure. After the step S20 of touch sensing procedure is finished, the processor 600 may determine whether a touch event is sensed. The processor 600 sets a touch flag and records a coordinate of a touch point corresponding to the touch event if the touch event is sensed. The processor 600 clears or resets the touch flag if the touch event is not sensed. Moreover, the processor 600 may selectively decide to perform the force sensing procedure according to the setting of touch flag or not.

In the step S20 of touch sensing procedure, the capacitance sensing circuit optionally sends an auxiliary signal with same phase as the touch capacitance-exciting signal to at least one corresponding force sensing electrode. In the step S20 of touch sensing procedure, the capacitance sensing circuit optionally sends the auxiliary signal with same phase as the touch capacitance-exciting signal to the touch sensing electrodes around the selected touch sensing electrode. In the step S30 of force sensing procedure, the capacitance sensing circuit may send a counter exciting signal to the selected touch sensing electrode, where the counter exciting signal is a DC reference signal (such as a zero volt signal) or a time varying signal with phase opposite to phase of the force capacitance-exciting signal. In the step S30 of force sensing procedure, the capacitance sensing circuit may send a shielding signal with phase same as the force capacitance-exciting signal to non-selected touch sensing electrodes.

Moreover, in above touch sensing procedure or force sensing procedure, the touch capacitance-exciting signal (or the force capacitance-exciting signal) may be a time varying signal such as sinusoid wave signal, square wave signal, triangular wave signal or trapezoid wave signal. The touch capacitance-exciting signal (or the force capacitance-exciting signal) may be a current source. The DC reference voltage may be a ground voltage of zero volt. The capacitance sensing circuit comprises a self-capacitance sensing circuit.

Thus, particular embodiments have been described. Other embodiments are within the scope of the following claims. For example, the actions recited in the claims may be performed in a different order and still achieve desirable results.

What is claimed is:

1. An integral sensing apparatus for touch and force sensing, comprising:
   an upper substrate having a first face and a second face opposite to the first face;
   a first electrode layer arranged on the second face and having a plurality of polygonal touch sensing electrodes staggered to each other, each of the polygonal touch sensing electrodes having a slant side;
   a second electrode layer having at least one force sensing electrode;
   a resilient dielectric layer arranged between the first electrode layer and the second electrode layer; and
   a capacitance sensing circuit electrically connected to the first electrode layer and the second electrode layer;
   wherein in touch sensing operation, the capacitance sensing circuit applies a touch capacitance-exciting signal to a selected touch sensing electrode and obtains a touch sensing signal from the selected touch sensing electrode, the capacitance sensing circuit applies an auxiliary signal with same phase as the touch capacitance-exciting signal to at least one corresponding force sensing electrode;
   wherein in force sensing operation, the capacitance sensing circuit applies a force capacitance-exciting signal to the at least one corresponding force sensing electrode and obtains a force sensing signal from the force sensing electrode, the capacitance sensing circuit sequentially or randomly applies a counter exciting signal to the selected touch sensing electrode.

2. The integral sensing apparatus in claim 1, wherein the capacitance sensing circuit comprises a self-capacitance sensing circuit.

3. The integral sensing apparatus in claim 1, wherein the resilient dielectric layer comprises a resilient material, the resilient material is compressively deformed under pressure and restores to original shape and volume if pressure is not present.

4. The integral sensing apparatus in claim 1, wherein the capacitance sensing circuit further applies the auxiliary signal to the touch sensing electrodes around the selected touch sensing electrode in touch sensing operation.

5. The integral sensing apparatus in claim 1, wherein the capacitance sensing circuit further applies a shielding signal with a same phase as that of the force capacitance-exciting signal to non-selected touch sensing electrodes in force sensing operation.

6. The integral sensing apparatus in claim 1, wherein the touch capacitance-exciting signal and the force capacitance-exciting signal are time varying signals.

7. The integral sensing apparatus in claim 6, wherein the counter exciting signal is a DC reference signal or a time varying signal with phase opposite to phase of the force capacitance-exciting signal.

8. The integral sensing apparatus in claim 7, wherein the DC reference signal is a zero volt signal.

9. The integral sensing apparatus in claim 1, wherein the upper substrate is a glass substrate or a polymer substrate.

10. The integral sensing apparatus in claim 1, further comprising a lower substrate arranged on a side of the resilient dielectric layer opposite to the first electrode layer, the lower substrate is a glass substrate or a polymer substrate.

11. The integral sensing apparatus in claim 10, wherein the lower substrate is a color filter substrate for a display screen.

12. A method for integral touch and force sensing, comprising:
providing an integral sensing apparatus for touch and force sensing, the integral sensing apparatus comprising an upper substrate having a first electrode layer having a plurality of polygonal touch sensing electrodes staggered to each other, each of the polygonal touch sensing electrodes having a slant side, a second electrode layer having at least one force sensing electrode, a resilient dielectric layer arranged between the first electrode layer and the second electrode layer, the resilient dielectric layer being compressively deformed under pressure and restoring to original shape and volume if pressure is not present, and a capacitance sensing circuit;
performing a touch sensing procedure by sequentially applying a touch capacitance-exciting signal to a selected touch sensing electrode and obtaining a touch sensing signal from the selected touch sensing electrode;
performing a force sensing procedure by sequentially applying a force capacitance-exciting signal to the at least one corresponding force sensing electrode and obtaining a force sensing signal from the force sensing electrode.

13. The method in claim 12, further comprising:
determining whether a touch event is sensed after the touch sensing procedure is finished; and
performing the force sensing procedure if the touch event is sensed.

14. The method in claim 12, further comprising:
determining whether a touch event is sensed after the touch sensing procedure is finished; and
setting a touch flag and a recording a coordinate of a touch point corresponding to the touch event if the touch event is sensed; and
clearing or resetting the touch flag if the touch event is not sensed.

15. The method in claim 14, wherein the force sensing procedure is selectively performed according to the setting of touch flag or not.

16. The method in claim 12, wherein the touch capacitance-exciting signal and the force capacitance-exciting signal are time varying signals.

17. The method in claim 16, further comprising:
applying an auxiliary signal with same phase as the touch capacitance-exciting signal to the at least one force sensing electrode in touch sensing procedure.

18. The method in claim 12, further comprising:
applying an auxiliary signal with same phase as the touch capacitance-exciting signal to the touch sensing electrodes around the selected touch sensing electrode in touch sensing procedure.

19. The method in claim 16, further comprising:
applying a counter exciting signal to the selected touch sensing electrode in force sensing procedure.

20. The method in claim 19, wherein the counter exciting signal is a DC reference signal or a time varying signal with phase opposite to phase of the force capacitance-exciting signal.

21. The method in claim 20, wherein the DC reference signal is a zero volt signal.

22. The method in claim 19, further comprising:
applying a shielding signal with phase same as the force capacitance-exciting signal to non-selected touch sensing electrodes in force sensing operation.

23. The method in claim 12, wherein the capacitance sensing circuit comprises a self-capacitance sensing circuit.

* * * * *